(12) United States Patent
Arimoto et al.

(10) Patent No.: US 7,119,785 B2
(45) Date of Patent: Oct. 10, 2006

(54) LIQUID CRYSTAL DISPLAY APPARATUS AND DRIVE METHOD THEREOF

(75) Inventors: Katsuyuki Arimoto, Okayama (JP); Yoshihito Ohta, Okayama (JP); Takahiro Kobayashi, Okayama (JP); Tsugio Murao, Habikino (JP); Taro Funamoto, Mino (JP)

(73) Assignee: Matsushita Electric Industrial Co., LTD, Osaka (JP)

( * ) Notice: Subject to any disclaimer, the term of this patent is extended or adjusted under 35 U.S.C. 154(b) by 351 days.

(21) Appl. No.: 10/469,011

(22) PCT Filed: Oct. 18, 2002

(86) PCT No.: PCT/JP02/10817

§ 371 (c)(1),
(2), (4) Date: Aug. 26, 2003

(87) PCT Pub. No.: WO03/036379

PCT Pub. Date: May 1, 2003

(65) Prior Publication Data
US 2004/0075635 A1    Apr. 22, 2004

(30) Foreign Application Priority Data
Oct. 23, 2001  (JP) .............................. 2001-324720

(51) Int. Cl.
G09G 3/36       (2006.01)
(52) U.S. Cl. .......................... 345/101; 345/94; 345/99
(58) Field of Classification Search ................ 345/101, 345/94
See application file for complete search history.

(56) References Cited

U.S. PATENT DOCUMENTS

| | | | | |
|---|---|---|---|---|
| 5,929,833 A | * | 7/1999 | Koshobu et al. | 345/101 |
| 6,069,620 A | | 5/2000 | Nakamura et al. | 345/214 |
| 6,803,899 B1 | * | 10/2004 | Masazumi et al. | 345/101 |
| 2001/0020925 A1 | * | 9/2001 | Hattori et al. | 345/87 |

FOREIGN PATENT DOCUMENTS

| | | |
|---|---|---|
| JP | 10-333123 | 12/1998 |
| JP | 11-109921 | 4/1999 |
| JP | 11-327516 | 11/1999 |
| JP | 2000-292776 | 10/2000 |
| JP | 2002-107695 | 4/2002 |

* cited by examiner

*Primary Examiner*—Amr A. Awad
*Assistant Examiner*—Seokyun Moon
(74) *Attorney, Agent, or Firm*—Wenderoth, Lind & Ponack, L.L.P.

(57) ABSTRACT

A liquid crystal display apparatus is provided with a detecting section (108) for detecting a value of a parameter that causes fluctuations in a back transition occurrence condition; a calculating section (106) for determining, in accordance with the detection value of the detecting section, at least one of a ratio of an time period of applying a high voltage with respect to one frame period, the high voltage being applied to the liquid crystal panel in order to prevent back transition, a magnitude of the high voltage, and an applied voltage corresponding to white display; and a controller (104) for alternately outputting a video signal and a non-image signal for applying the high voltage and driving the liquid crystal panel on a condition in accordance with the determination result of the calculating section. With this, it is possible to always display video irrespectively of fluctuation in the back transition occurrence condition.

6 Claims, 15 Drawing Sheets

LIQUID CRYSTAL DISPLAY APPARATUS AND DRIVE METHOD THEREOF

TECHNICAL FIELD

The present invention relates to liquid crystal display apparatuses and, particularly, to a liquid crystal display apparatus using a liquid crystal panel in OCB (Optically self-Compensated Birefringence) mode.

BACKGROUND ART

Currently, liquid crystal display apparatuses that have been widely available utilize a liquid crystal panel in TN (Twisted Nematic) mode. In recent years, for the purpose of overcoming drawbacks in TN mode of a narrow viewing angle and low response capabilities, liquid crystal display apparatuses using a liquid crystal panel in OCB mode have been developed and reported (Japanese Patent Laid-Open Publication No. 7-84254,—Japanese Patent Laid-Open Publication No. 9-96790, etc.)

In the liquid crystal panel in OCB mode, as disclosed in the above Japanese Patent Laid-Open Publication No. 9-96790, special processing is required for causing a transition from a spray configuration to a bend configuration (such a transition from the spray configuration to the bend configuration is hereinafter referred to as "transition") prior to a start of video display. This processing, however, is not directly related to the present invention, and therefore is not further described herein.

Now, in the liquid crystal panel in OCB mode, as illustrated in FIG. 14, even if the above processing causes the state of OCB cells to make a transition to the bend configuration, the state returns back to the spray configuration if a voltage applied to the OCB cells continues to be lower than a constant voltage Vc (such a transition from the bend configuration back to the spray configuration is hereinafter referred to as "back transition"). Therefore, as represented by a characteristic a illustrated in FIG. 14, most liquid crystal display apparatuses using a liquid crystal panel in OCB mode limit the amplitude of a video signal so that a voltage (larger than Vc) within a range enabling the bend configuration to be kept is always applied to the OCB cells (note that this is a case of normally white). However, if the amplitude of the video signal is limited as such, the maximum transmittance of the liquid crystal panel is small (Ta in FIG. 14). Consequently, the maximum luminance (luminance in white display (bright display)) of the liquid panel is decreased, there by causing inconveniences, such as that a desired luminance cannot be obtained.

However, with a high voltage being periodically applied to the OCB cells, back transition does not occur even if the voltage applied to the OCB cells temporarily becomes lower than Vc, which is disclosed in Japanese Patent Laid-Open Publication No. 11-109921 and Japanese Liquid Crystal Society Journal, Apr. 25, 1999 (Vol. 3, No. 2) P.99 (17) through P.106 (24). With this being used for displaying an image of one frame, one frame period is divided into a period for displaying the image and a period for applying a high voltage. Therefore, as represented by a characteristic b illustrated in FIG. 14, the range of the voltage applicable to the OCB cells as a video signal was able to be expanded to Vw, which is lower tan Vc, Such a driving scheme is hereinafter referred to as "anti-back-transition driving". Also, the high voltage regularly applied to the OCB cells for the purpose of preventing back transition is hereinafter referred to as "anti-back-transition voltage". According to the anti-back-transition driving, the maximum transmittance of the liquid crystal panel can be increased (Tb illustrated in FIG. 14). As a result, the maximum luminance of the liquid crystal display apparatus can be increased. Note that the inventors have confirmed that preventive effects against back transition are increased as the anti-back-transition voltage is increased and also as a ratio of a time period with respect to one frame period (a ratio of a time period during which the voltage is maintained with respect to one frame period) is increased. Note that the preventive effects against back transition represent herein how hard back transition occurs when parameters (the ratio of the time period of applying the anti-back-transition voltage with respect to one frame period and a liquid crystal temperature), which cause fluctuations in a back transition occurrence condition, are fluctuated.

However, when the above-described anti-back-transition driving is performed, it was found that the magnitude of the anti-back-transition voltage required for preventing anti-back-transition and the ratio of the time period with respect to one frame period are fluctuated by various factors, such as the temperature of the liquid crystal panel (more precisely, liquid crystal).

Therefore, the inventors have investigated, by way of example, a relation between the ratio of the time period of applying the anti-back-transition voltage with respect to one frame period and the temperature of the liquid crystal panel. Consequently, in a case of an OCB liquid crystal material used by the inventors, as denoted by a long and short dashed line in FIG. 15, it is found that as the liquid crystal temperature is increased, the ratio of the time period of applying the anti-back-transition voltage with respect to one frame period is increased. Therefore, for example, if the ratio of the time period of applying the anti-back-transition voltage with respect to one frame period is at the minimum as required at room temperature, back transition occurs when the liquid crystal temperature is high, making it impossible to perform video display. Therefore, in order to make it possible to perform video display even when the temperature of the liquid crystal panel is increased, one measure can be thought to apply the anti-back-transition voltage at a sufficiently large ratio so as not to cause back transition even when the temperature of the liquid crystal panel is 80° C., for example. However, as the ratio of the time period of applying the anti-back-transition voltage (voltage corresponding to black display) with respect to one frame period is increased, the maximum luminance is disadvantageously decreased. Note that the luminance referred to herein is a brightness felt by people, and is none other than a time integral of the transmittance within one frame period. That is why the maximum luminance is decreased as the ratio of the applying time (black display) with respect to one frame period is increased.

Furthermore, the inventors also confirmed that the preventive effects against back transition can be increased by increasing the magnitude of the anti-back-transition voltage. Therefore, one measure can be thought such as that, in order to make it possible to perform video display even when the temperature of the liquid crystal panel is increased, a sufficiently large voltage is applied as the anti-back-transition voltage so as not to cause back transition even when the temperature of the liquid crystal panel is 80° C., for example. However, if a voltage larger than an applied voltage corresponding to black display (dark display) (Vb in FIG. 14) is applied to an OCB liquid crystal, the transmittance of the OCB liquid crystal is increased as illustrated in FIG. 14. Therefore, the maximum luminance (luminance at black display) is disadvantageously increased (that is, contrast is impaired).

Still further, the inventors also confirmed that the preventive effects against back transition can be also enhanced by increasing the applied voltage (Vw in FIG. 14) corresponding to white display. Therefore, one measure can be thought such as that, in order to make it possible to perform video display even when the temperature of the liquid crystal panel is increased, a sufficiently large voltage is applied so as not to cause back transition even when the temperature of the liquid crystal panel is 80° C., for example. However, as the applied voltage corresponding to white display is increased, the transmittance of the liquid crystal at the time of white display is decreased, thereby causing a decrease in maximum luminance.

Therefore, an object of the present invention is to provide a liquid crystal display apparatus capable of always optimally displaying video irrespectively of fluctuations in a back transition occurrence condition.

SUMMARY OF THE INVENTION

To achieve the above object, the present invention adopts a structure as described below. Note that reference numerals and terms in parentheses indicate a correspondence with the embodiments described further below in order to help understanding of the present invention, and is not meant to be restrict the scope of the present invention.

A liquid crystal apparatus (100, 200, 300, 400, 500) of the present invention displays video by driving a liquid crystal panel (110) in OCB mode based on a video signal, including: a detecting section (108, 408a through 408d, 516) for detecting a value of a parameter (temperature, frame frequency) that causes fluctuations in a back transition occurrence condition; a calculating section (106, 206, 306, 406, 506) for determining, in accordance with the detection value of the detecting section, at least one of a ratio of a time period of applying a high voltage with respect to one frame period, the high voltage being applied to the liquid crystal panel in order to prevent back transition (anti-back-transition voltage), a magnitude of the high voltage, and an applied voltage (Vw) corresponding to white display; and a controller (104, 204, 304) for alternately outputting a video signal and a non-image signal for applying the high voltage and driving the liquid crystal panel on a condition in accordance with the determination result of the calculating section. As such, according to the present invention, the condition- of driving the liquid crystal panel can be controlled on a real-time basis in accordance with fluctuations in the value of the parameter which causes fluctuations in the back transition occurrence condition. Therefore, it is possible to always optimally display video irrespectively of fluctuations in the back transition occurrence condition. Note that examples of "the parameter that causes fluctuations in a back transition occurrence condition" are a liquid crystal temperature and a frame frequency of the video signal.

DETAILED DESCRIPTION OF THE INVENTION

Various embodiments of the present invention are described below with reference to the drawings.

(First Embodiment)

Figure 1:
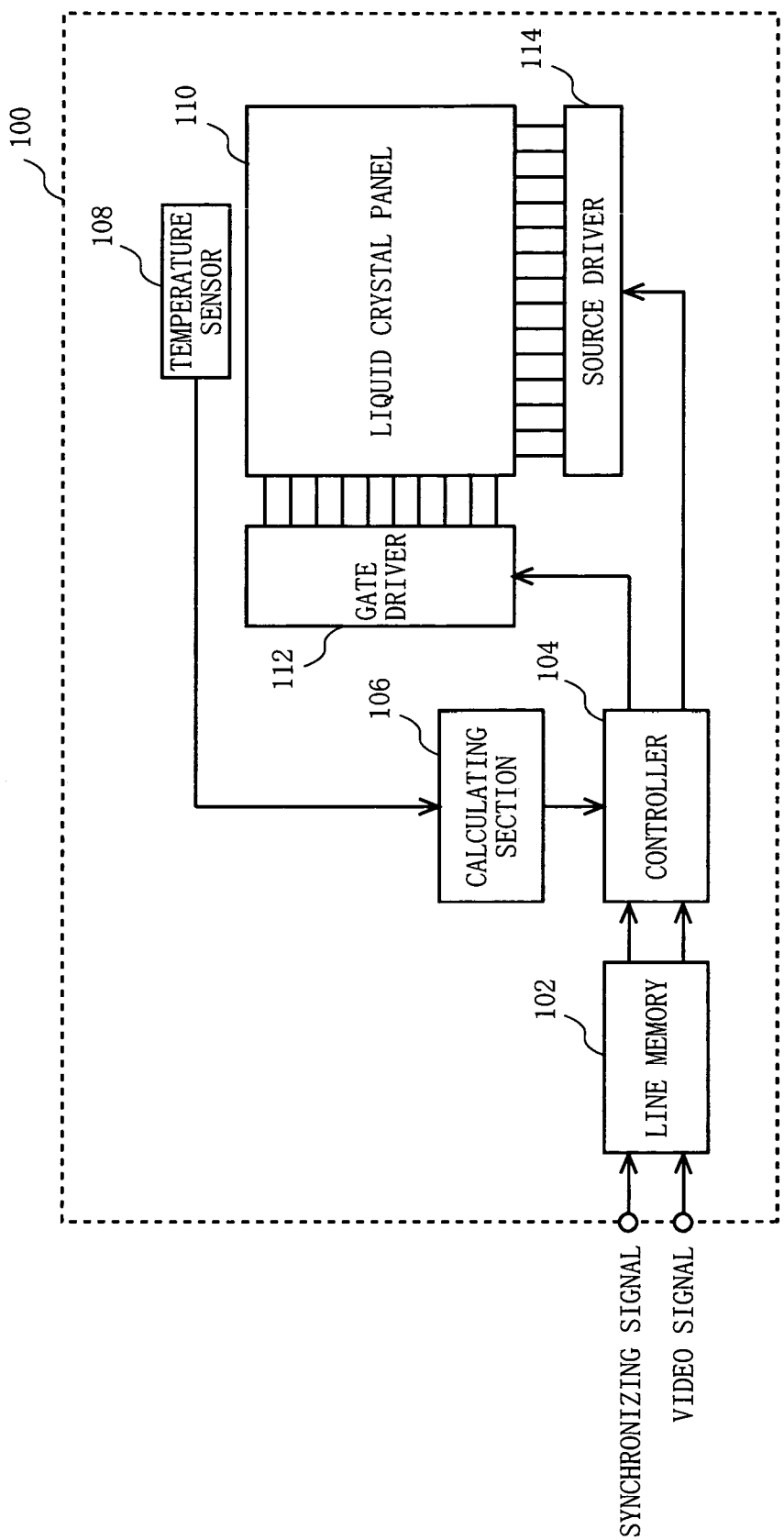
FIG. 1 is a block diagram illustrating the configuration of the liquid crystal display apparatus according to a first embodiment of the present invention.

FIG. 1 illustrates the configuration of a liquid crystal display apparatus according to a first embodiment of the present invention. In FIG. 1, a liquid crystal display apparatus 100 includes a line memory 102, a controller 104, a calculating section 106, a temperature sensor 108, a liquid crystal panel 110, a gate driver 112, and a source driver 114. Note that it is assumed herein that the liquid crystal panel 100 operates in normally white mode.

The liquid crystal display apparatus 100 is supplied with a video signal and a synchronizing signal. The video signal is digitized as required, and is then written in the line memory 102. The image signal thus temporarily stored in the line memory 102 is read at double the speed (clock frequency) at the time of writing, and is then supplied to the controller 104. The controller 104 alternately outputs, to the source driver 114, an image signal for one line read from the line memory 102 and a non-image signal (a signal for applying an anti-back-transition voltage to OCB cells) for one line.

On the other hand, the controller 104 outputs a control signal to the gate driver 112. Based on this control signal, the gate driver 112 sequentially selects a gate line in which the image signal or the non-image signal that is supplied to the source driver 114 should be written. In this manner, the image signal and the non-image signal are written once each for one frame period in each pixel of the liquid crystal panel 110. During a period from a time when the non-image signal is written to a time when the image signal is written, the non-image signal is retained in the pixel. By changing timing of writing of the image signal and timing of writing of the non-image signal, it is possible to change the time period of retaining the non-image signal in one frame period.

The temperature sensor 108 is provided in the vicinity of the liquid crystal panel 110. Based on the temperature detected by the temperature sensor 108, the calculating section 106 calculates a ratio of a time period of applying an optimal anti-back-transition voltage with respect to one frame period.

Figure 2:
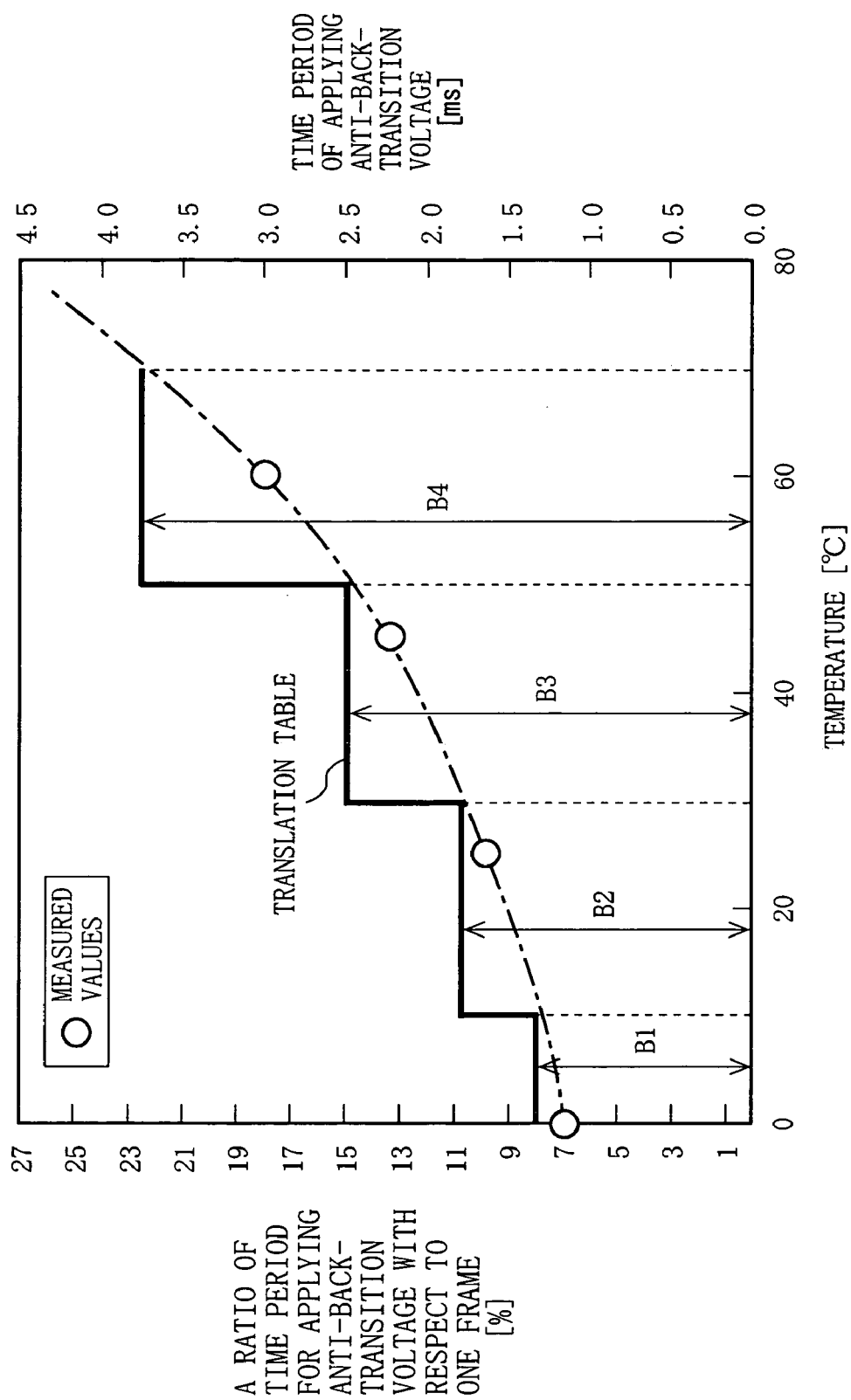
FIG. 2 is an illustration showing a relation between inputs and outputs of a calculating section.

FIG. 2 illustrates input-output characteristics of the calculating section 106. In FIG. 2, circles each represent a measurement result for each temperature of a minimum value of the ratio of a time period of applying the anti-back-transition voltage, with which back transition is preventable, with respect to one frame period. A long and short dashed line represents a relation between detection results of the temperature sensor 108 and the minimum values of the ratio of the time period of applying the anti-back-transition voltage, with which back transition is preventable, with respect to one frame period, wherein it is assumed that the magnitude of the anti-back-transition voltage is constant. Note that, as described further below, as the frame frequency of the video signal is fluctuated, the minimum value of the ratio of the time period of applying the anti-back-transition voltage, with which back transition is preventable, with respect to one frame period is fluctuated. Therefore, the input-output characteristics illustrated herein are in a case where the frame frequency of the video signal is constant (60 Hz). Note that the vertical axis on right in FIG. 2 indicates time periods of applying the anti-back-transition voltage per one frame in a case where the frame frequency is 60 Hz. The calculating section 106 uses a translation table, as represented by a solid line in FIG. 2, created in advance based on the relation represented by this long and short dashed line to output any one of four values (B1 to B4) corresponding to the time periods of applying the anti-back-transition voltage per one frame in accordance with the detection result of the temperature sensor 108. More specifically, the calculating section 106 outputs B1 when the temperature detected by the temperature sensor 108 is lower than 10° C.; B2 when the temperature is equal to or higher than 10° C. and lower than 30° C.; B3 when the temperature is equal to or higher than 30° C. and lower than 50° C.; and B4 when the temperature is equal to or higher than 50° C. and lower than 70° C. Note that this example does not assume a case of 70° C. or higher, and therefore no output value corresponding to 70° C. or higher is set. The values of B1 to B4 are set so as to each indicate a time period during which at least back transition does not occur within the relevant temperature range (a time period longer than the time period represented by the long and short dashed line). Based on the output from the calculating section 106, the controller 104 causes the gate driver 112 to select a gate line in appropriate timing. With reference to FIGS. 3 through 6, the operation of selecting a gate line is described below.

Figure 3:
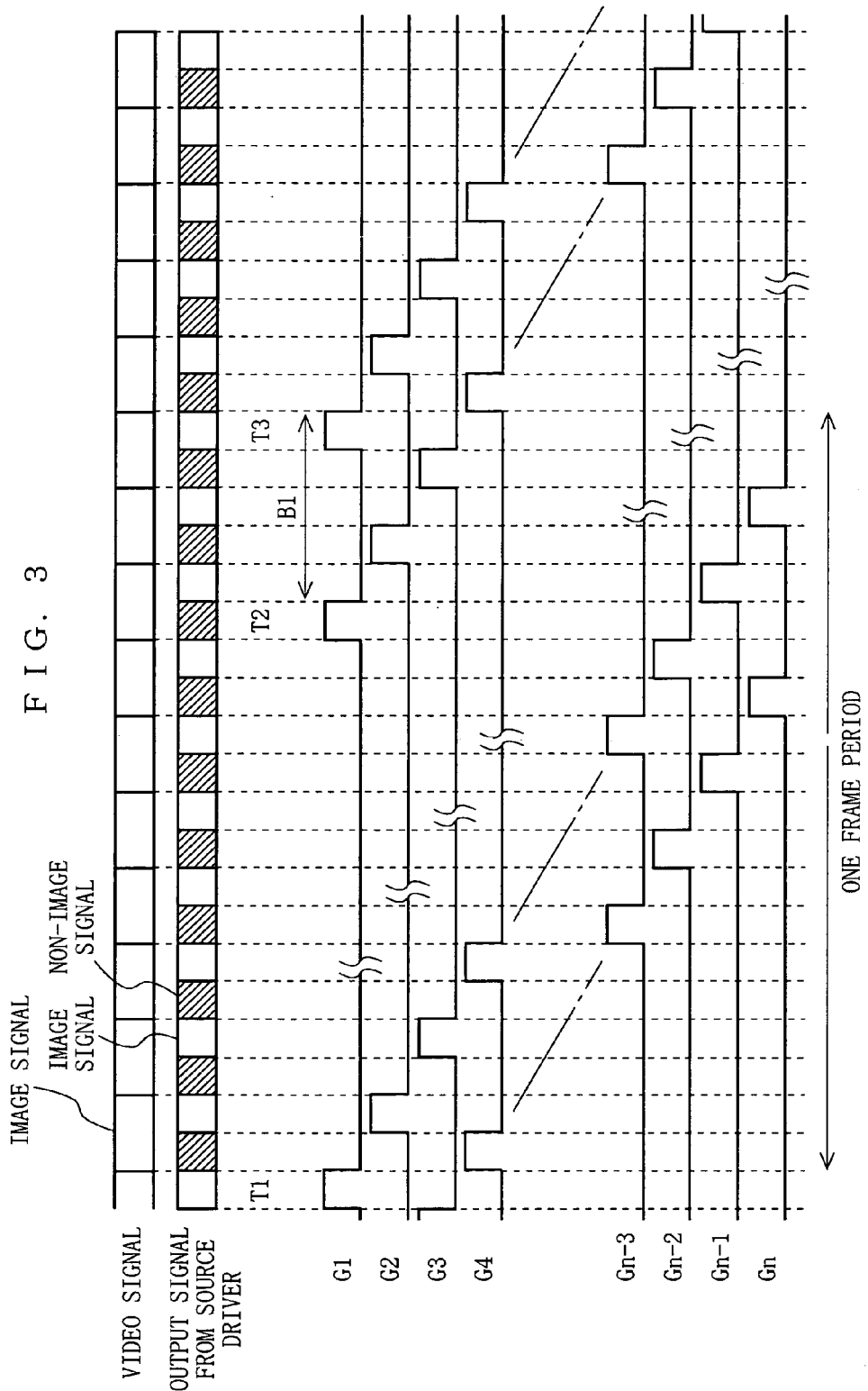
FIG. 3 is an illustration showing an operation of selecting a gate line when an output from the calculating section is B1.

FIG. 3 illustrates an example where the output from the calculating section 106 is B1 (that is, the temperature detected by the temperature sensor 108 is lower than 10° C.). In FIG. 3, as for a gate line G1 of the first line, a gate pulse of the gate line G1 becomes HIGH in timing T1 in which the source driver 114 outputs an image signal, and pixels on the gate line G1 are applied with a voltage corresponding to this image signal. The gate pulse of the gate line G1 then becomes HIGH in timing T2 in which the source driver 114 outputs a non-image signal, and the pixels on the gate line G1 are applied with an anti-back-transition voltage. Further, the gate pulse of the gate line G1 becomes HIGH in timing T3 in which the source driver 114 outputs an image signal, and the pixels on the gate line G1 are applied with a voltage corresponding to this image signal. A time period from the timing T2 in which the anti-back-transition voltage is applied to the timing T3 in which the voltage corresponding to the image signal is applied next is a time period B1, which is output from the calculating section 106, for applying the anti-back-transition voltage per one frame. Similarly, other gate lines G2 through Gn are scanned. Then, the time period for applying the anti-back-transition voltage per one frame is B1 for all gate lines G1 through Gn.

Figure 4:
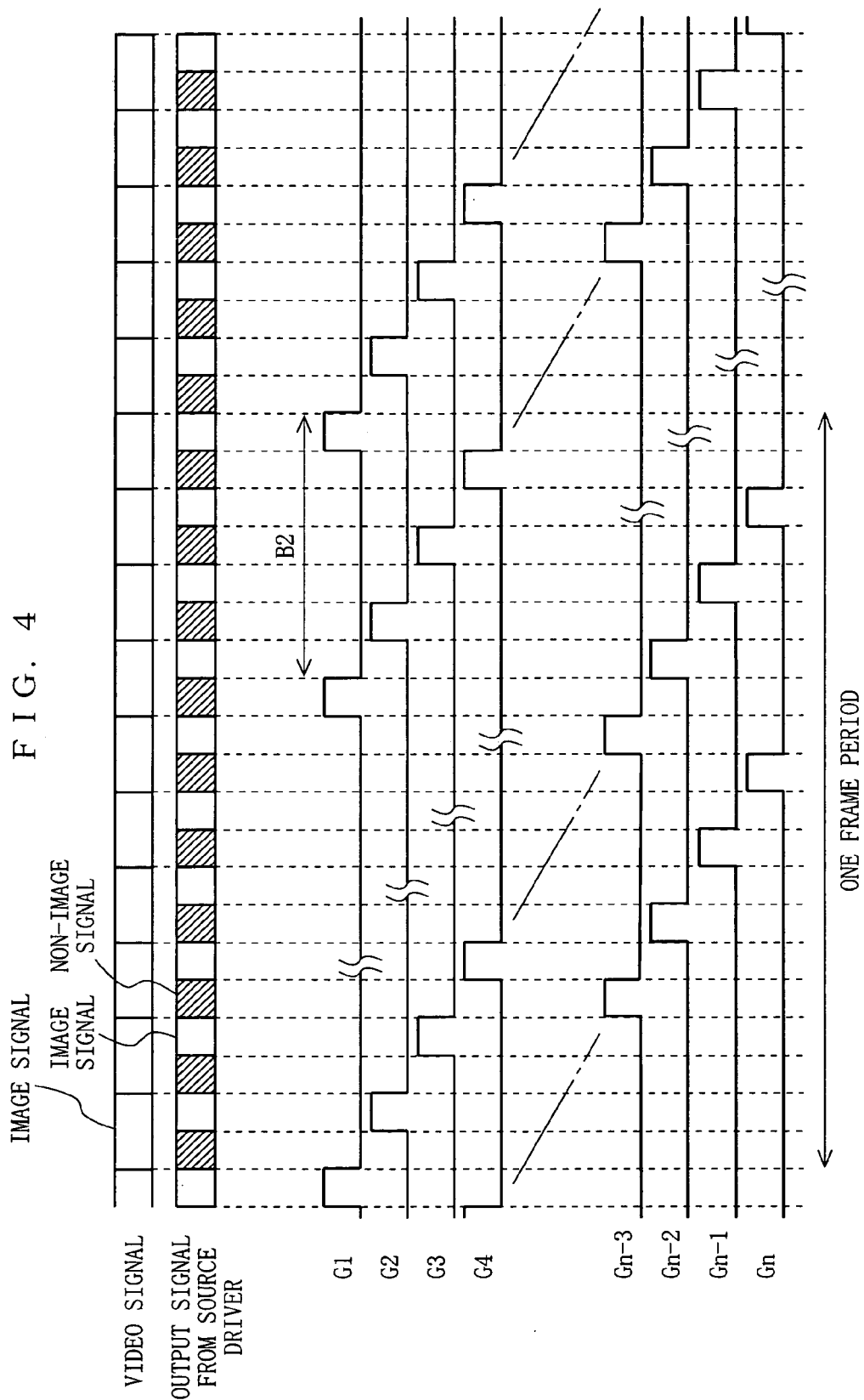
FIG. 4 is an illustration showing an operation of selecting a gate line when an output from the calculating section is B2.
Figure 5:
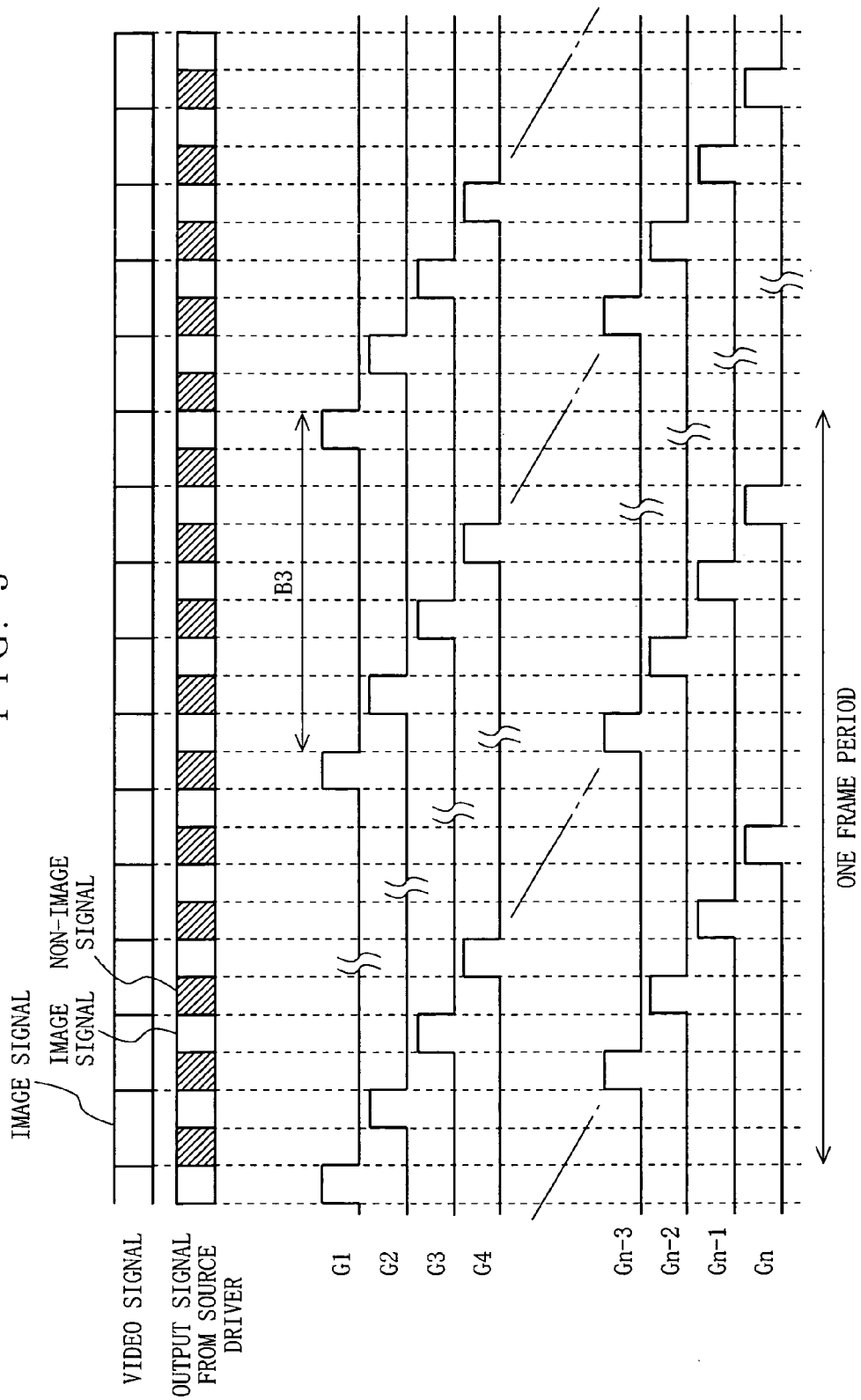
FIG. 5 is an illustration showing an operation of selecting a gate line when an output from the calculating section is B3.
Figure 6:
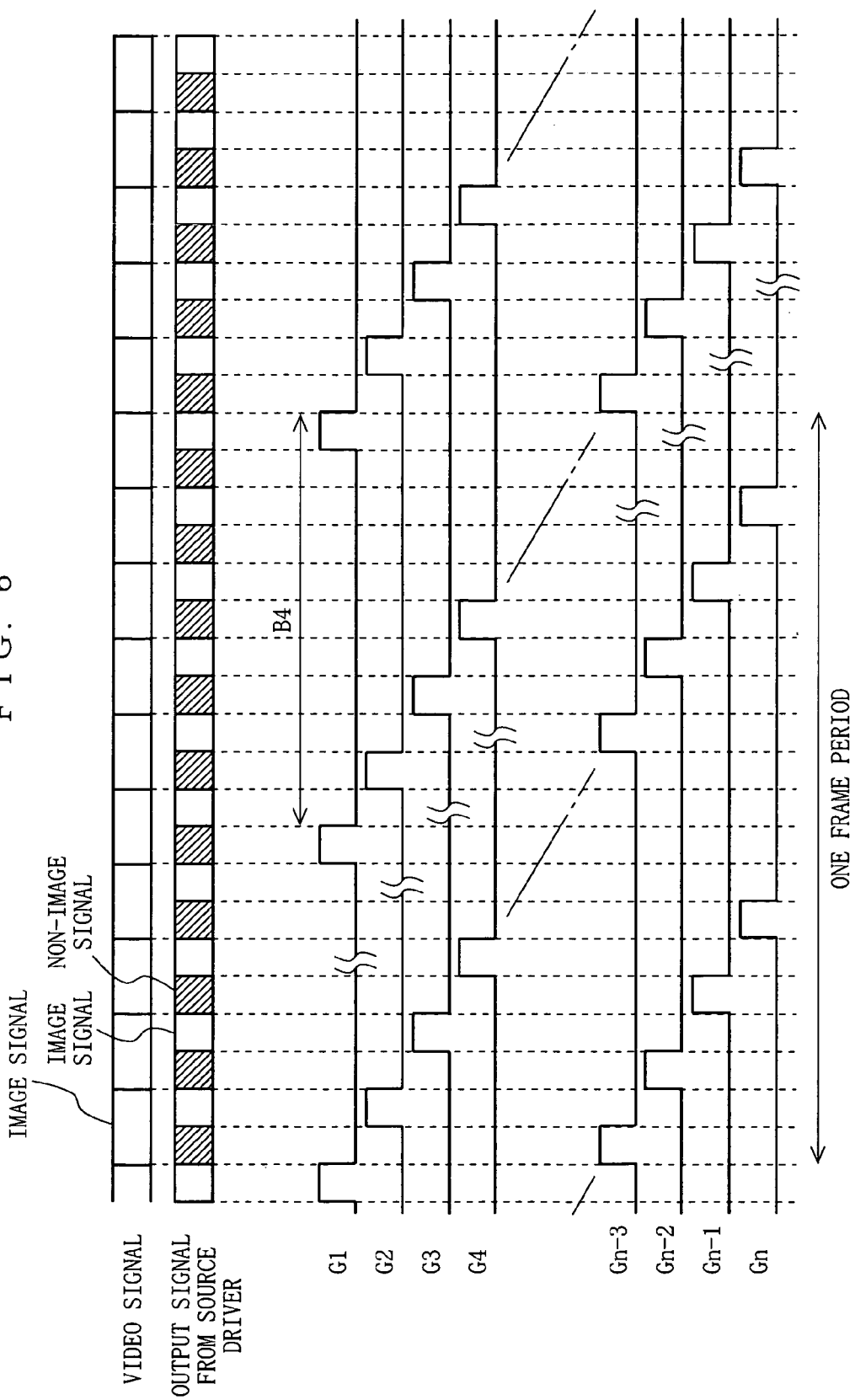
FIG. 6 is an illustration showing an operation of selecting a gate line when an output from the calculating section is B4.

FIG. 4 illustrates an example where the output from the calculating section 106 is B2 (that is, the temperature detected by the temperature sensor 108 is equal to or higher than 10° C. and lower than 30° C.). Similarly, FIG. 5 illustrates an example where the output from the calculating section 106 is B3 (that is, the temperature detected by the temperature sensor 108 is equal to or higher than 30° C. and lower than 50° C.), and FIG. 6 illustrates an example where the output from the calculating section 106 is B4 (that is, the temperature detected by the temperature sensor 108 is equal to or higher than 50° C. and lower than 70° C.). Note that, for convenience in illustration, a ratio in length of B1 through B4 in FIG. 2 is not accurately made to coincide with a ratio in length of B1 through B4 in FIGS. 3 through 6. However, this will not be obstructive to understanding the invention. As such, by varying the timing in which the gate pulse of each gate line becomes HIGH, it is possible to apply the anti-back-transition voltage for an arbitrary period of time.

In the above-described manner, each pixel on the liquid crystal panel 110 is applied with the anti-back-transition voltage for an appropriate period of time in accordance with the detection result of the temperature sensor 108. Therefore, back transition can be prevented even when the liquid crystal temperature rises. Furthermore, when the liquid crystal temperature is low, the ratio of the time period of applying the anti-back-transition with respect to one frame period is decreased. Therefore, a decrease in maximum luminance due to application of the anti-back-transition voltage can be suppressed.

Note that, in the present embodiment, the calculating section 106 uses the translation table of four steps. Needless to say, the number of steps is not restricted to four, and can be increased as appropriate to achieve a control with higher accuracy. Also, a smoother transfer function instead of the translation table can be used to achieve a control with higher accuracy.

Furthermore, in the present embodiment, the temperature sensor 108 detects the temperature in the vicinity of the liquid panel 110. Ideally, it is most preferable to detect the temperature of the liquid crystal itself. However, detecting the temperature of the liquid crystal itself is not impossible but very difficult. Therefore, in practice, it is preferable to place the sensor in a location in the vicinity of the liquid panel 110, the location not affecting display or not susceptible to heat of a backlight (for example, in the vicinity of the rim of a glass substrate).

(Second Embodiment)

In the above-described first embodiment, the preventive effects against back transition are controlled by controlling the ratio of the time period of applying the anti-back-transition voltage with respect to one frame period. Alternatively, the preventive effects against back transition can be controlled by controlling the magnitude of the anti-backtransition voltage. As a second embodiment, a liquid crystal display apparatus which controls the preventive effects against back transition by controlling the magnitude of the anti-back-transition voltage is described below.

Figure 7:
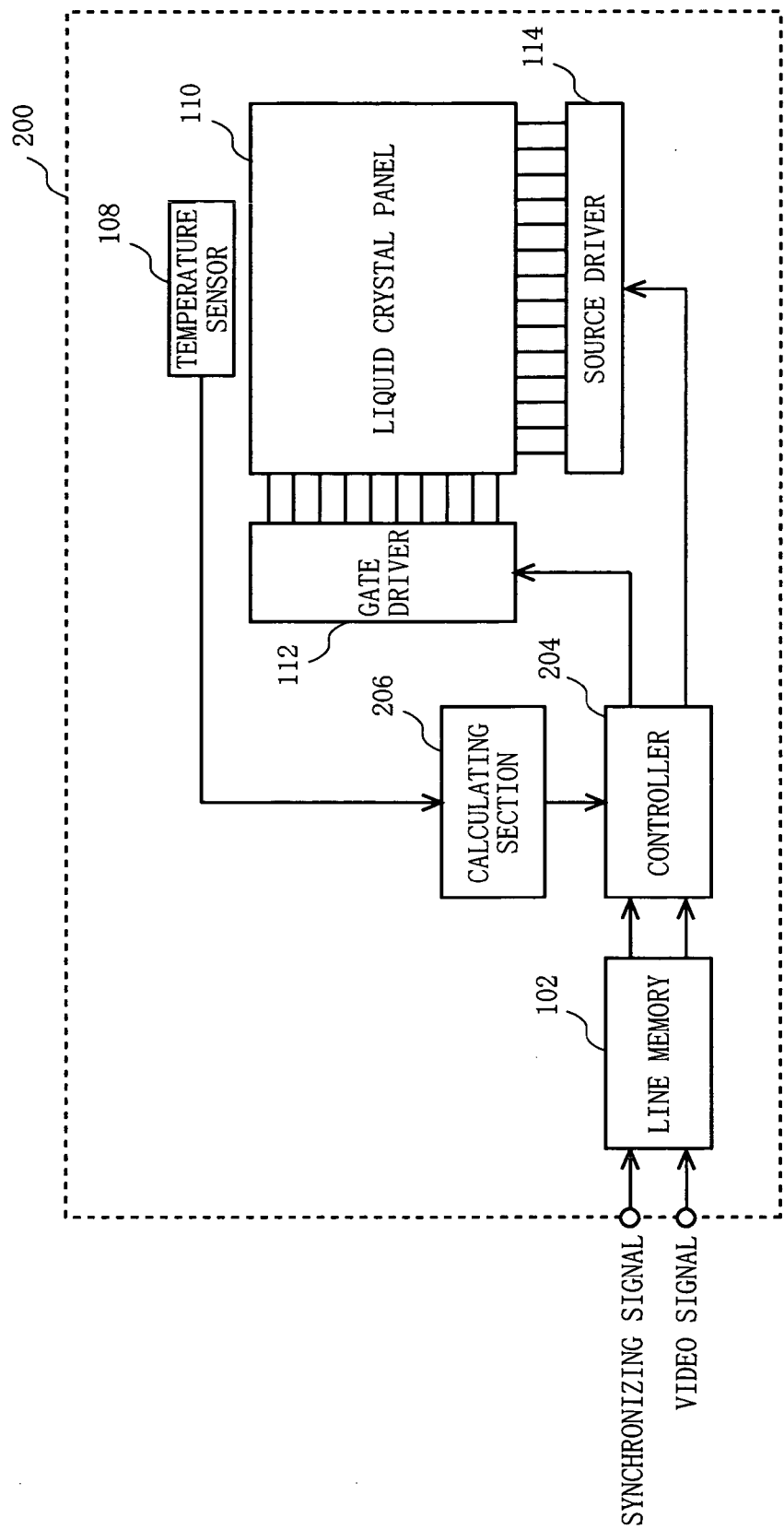
FIG. 7 is a block diagram illustrating the configuration of a liquid crystal display apparatus according to a second embodiment of the present invention.

FIG. 7 illustrates the configuration of the liquid crystal display apparatus according to the second embodiment of the present invention. In FIG. 7, a liquid crystal display apparatus 200 includes the line memory 102, the temperature sensor 108, the liquid crystal panel 110, the gate driver 112, the source driver 114, a controller 204, and a calculating section 206. Note that, in FIG. 7, the components equivalent to those in FIG. 1 are provided with the same reference numerals, and are not described herein.

The calculating section 206 calculates the magnitude of an optimal anti-back-transition voltage based on the temperature detected by the temperature sensor 108.

Figure 8:
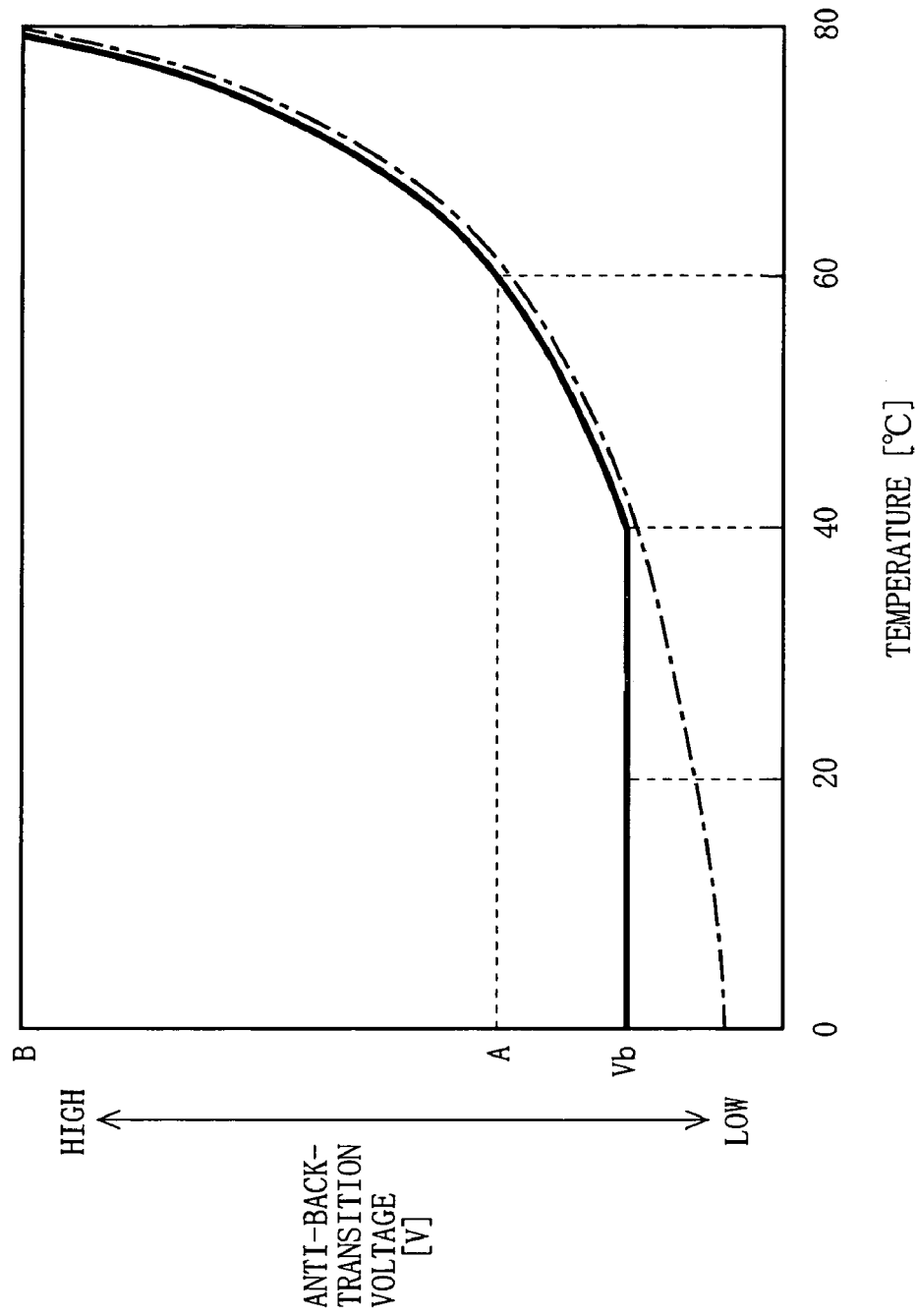
FIG. 8 is an illustration showing a relation between inputs and outputs of a calculating section.
Figure 14:
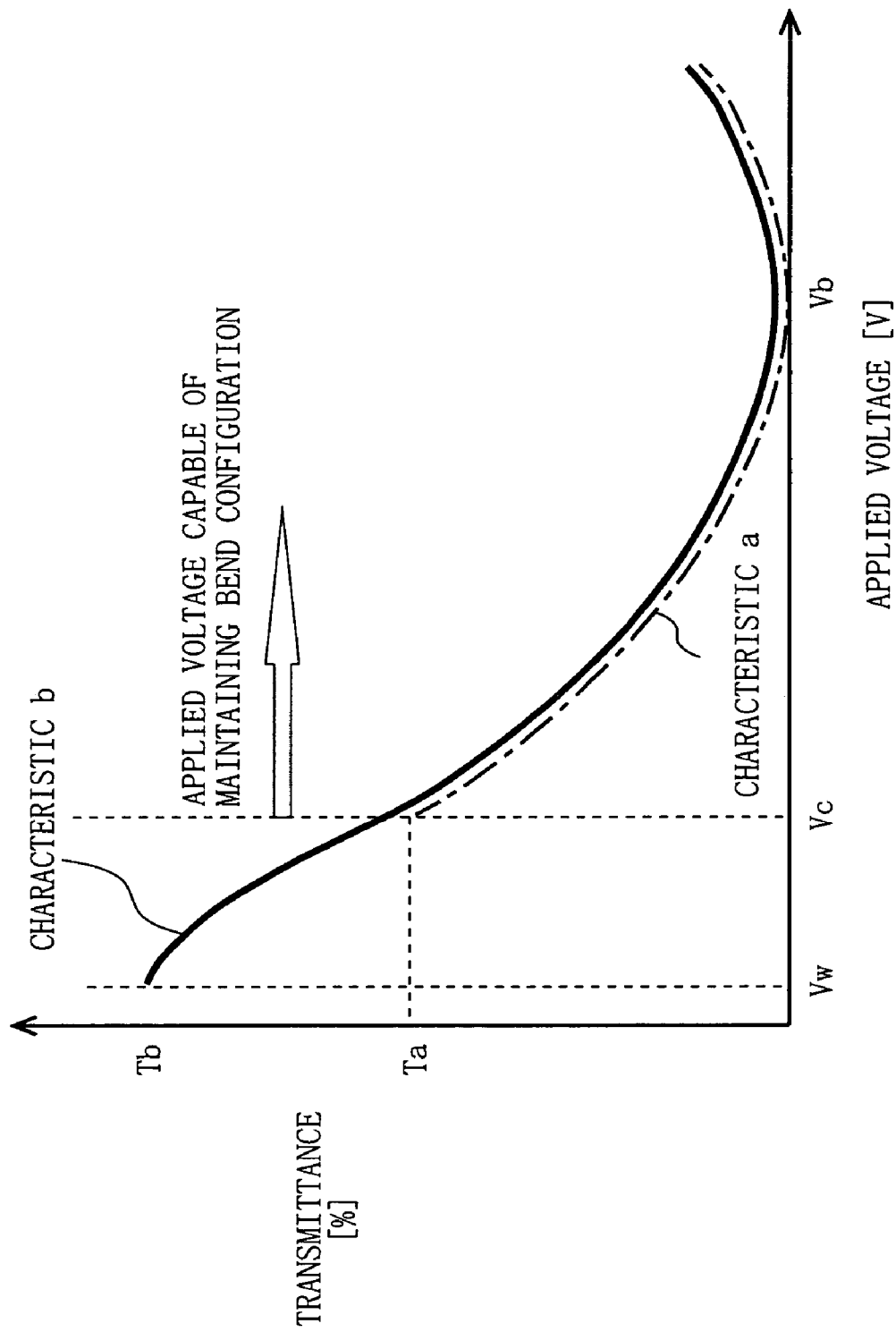
FIG. 14 is an illustration showing voltage-transmittance characteristics of an OCB liquid crystal.
Figure 15:
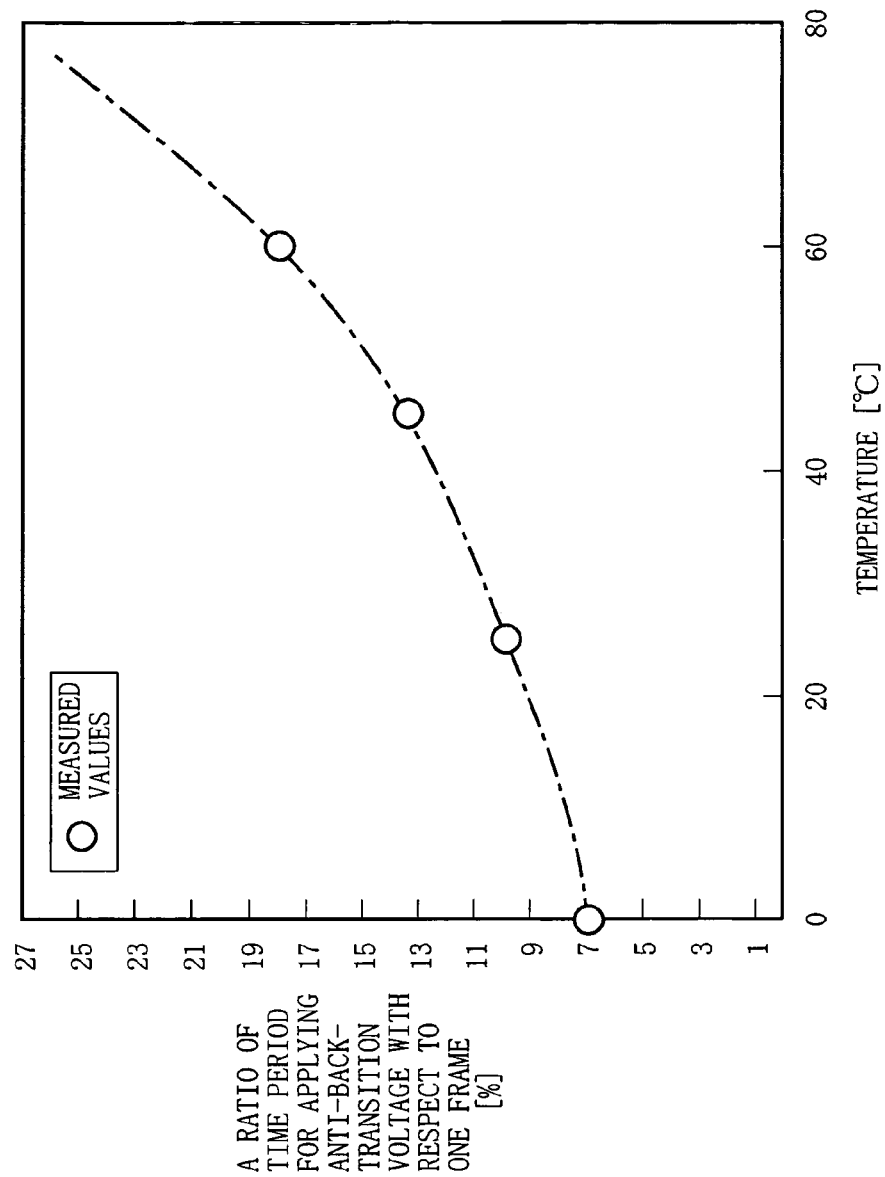
FIG. 15 is an illustration showing a relation between temperatures of the liquid crystal and minimum values of a ratio of a time period of applying an anti-back-transition voltage, with which back transition is preventable, with respect to one frame period.

FIG. 8 illustrates input-output characteristics of the calculating section 206. In FIG. 8, a long and short dashed line represents a relation between detection results of the temperature sensor 108 and the minimum values of the ratio of the time period of applying the anti-back-transition voltage with which back transition is preventable, wherein it is assumed that the ratio of the time period of applying the anti-back-transition voltage with respect to one frame period is constant. Note that, as described further below, as the frame frequency of the video signal is fluctuated, the minimum value of the ratio of the time period of applying the anti-back-transition voltage with which back transition is preventable with respect to one frame period is changed. Therefore, the input-output characteristics illustrated herein are in a case where the frame frequency of the video signal is constant. Note that the characteristics represented by the long and short dashed line in FIG. 8 are varied depending on the liquid crystal material used for the liquid crystal panel 110, and therefore only general tendencies are illustrated herein. As evident from FIG. 8, under the conditions that the ratio of the time period of applying the anti-back-transition voltage with respect to one frame period is constant, as the temperature in the vicinity of the liquid crystal panel 110 is increased, it is required to apply a larger voltage as the anti-back-transition voltage. Therefore, the calculating section 206 outputs the magnitude of the anti-back-transition voltage based on a relation as represented by a solid line in FIG. 8 in accordance with the output from the temperature sensor 108. More specifically, when the temperature detected by the temperature sensor 108 is lower than 40° C., the calculating section 206 notifies the controller 204 that the applied voltage Vb corresponding to black display is applied as the anti-back-transition voltage to the liquid crystal. Also, for example, when the temperature detected by the temperature sensor 108 is 60° C., the calculating section 206 notifies the controller 204 that a voltage A is applied as the anti-back-transition voltage to the liquid crystal. Similarly, when the temperature detected by the temperature sensor 108 is 80° C., the calculating section 206 notifies the controller 204 that a voltage B is applied as the anti-back-transition voltage to the liquid crystal. Note that the output corresponding to a temperature lower than 40° C. is always Vb because, if a voltage lower than Vb is used as the anti-back-transition voltage, the transmittance of the OCB liquid crystal is increased as illustrated in FIG. 14, thereby causing the minimum luminance (luminance at the time of black display) to be increased (that is, contrast is lost).

The controller 204 alternately outputs, to the source driver 114, an image signal for one line read from the line memory 102 and a non-image signal for one line for applying the voltage notified by the calculating section 206 as the anti-back-transition voltage to the OCB cells.

In the above-described manner, each pixel on the liquid crystal panel 110 is applied with the anti-back-transition voltage for an appropriate period of time in accordance with the detection result of the temperature sensor 108. Therefore, back transition can be prevented even when the liquid crystal temperature is increased. Furthermore, when the liquid crystal temperature is low, the magnitude of the anti-back-transition voltage is suppressed to Vb. Therefore, it is possible to suppress an increase in minimum luminance caused by applying the voltage higher than Vb as the anti-back-transition voltage.

Note that, in the present embodiment, the output from the calculating section 206 corresponding to the temperature equal to or higher than 40° C. is determined based on a smooth transfer function as illustrated in FIG. 8. Alternatively, determination can be made based on the translation table as illustrated in FIG. 2.

(Third Embodiment)

In the above-described first and second embodiments, the preventive effects against back transition are controlled by controlling the ratio of the time period of applying the anti-back-transition voltage with respect to one frame period or the magnitude of the anti-back-transition voltage. Instead, the preventive effects against back transition can also be controlled by controlling an applied voltage corresponding to white display. As a third embodiment, a liquid crystal display apparatus which controls the preventive effects against back transition by controlling the applied voltage corresponding to white display is described below.

Figure 9:
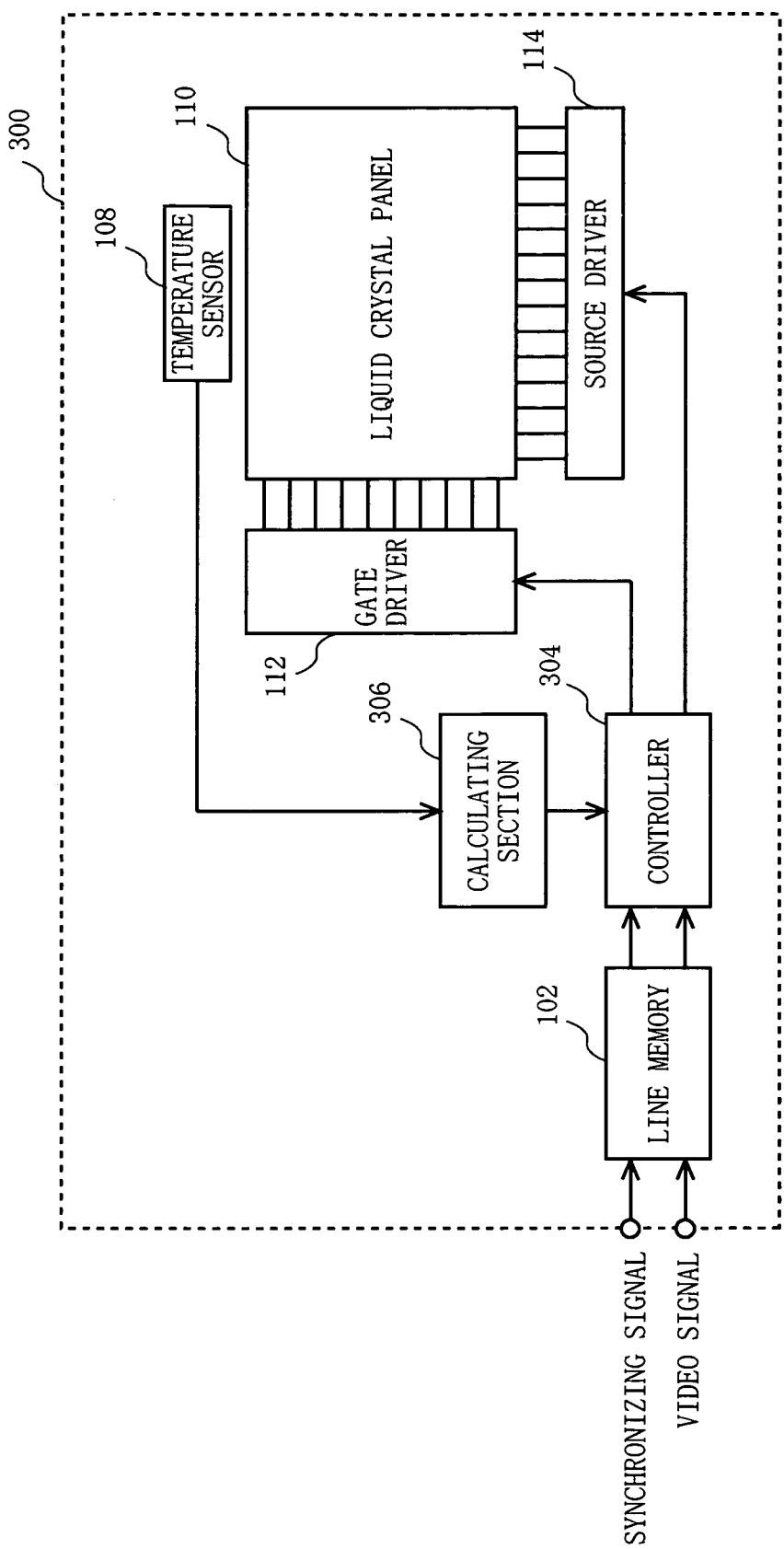
FIG. 9 is a block diagram illustrating the configuration of a liquid crystal display apparatus according to a third embodiment of the present invention.

FIG. 9 illustrates the configuration of the liquid display apparatus according to the third embodiment of the present invention. In FIG. 9, a liquid crystal display apparatus 300 includes the line memory 102, the temperature sensor 108, the liquid crystal panel 110, the gate driver 112, the source driver 114, a controller 304, and a calculating section 306. Note that, in FIG. 9, the components equivalent to those in FIG. 1 are provided with the same reference numerals, and are not described herein.

The calculating section 306 calculates an optimal gain of the video signal based on the temperature detected by the temperature sensor 108.

Figure 10:
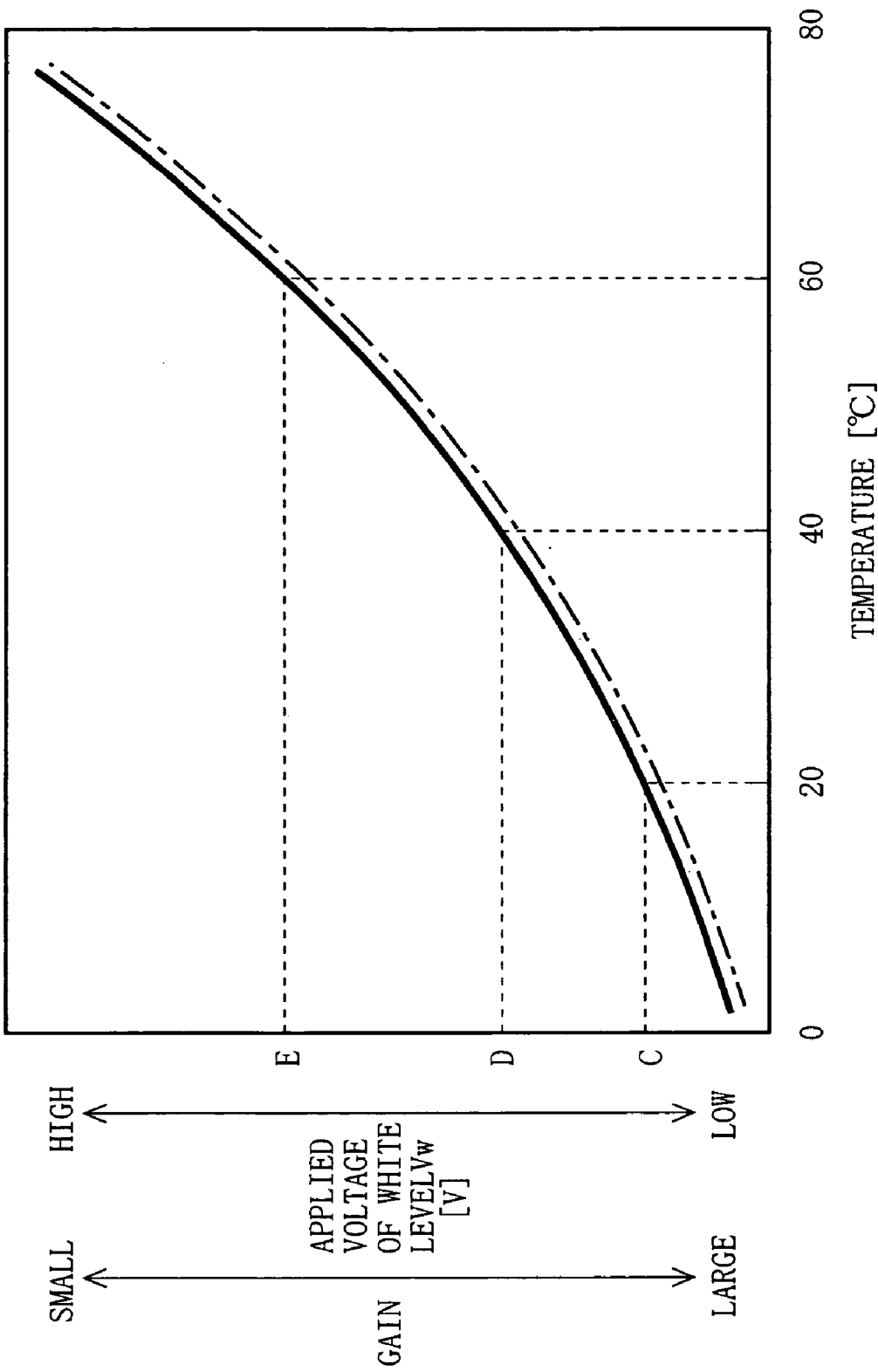
FIG. 10 is an illustration showing a relation between inputs and outputs of a calculating section.

FIG. 10 illustrates input-output characteristics of the calculating section 306. In FIG. 10, a long and short dashed line represents a relation between detection results of the temperature sensor 108 and the minimum values of the anti-back-transition voltage which corresponds to white display and can prevent back transition, wherein it is assumed that the ratio of the time period of applying the anti-back-transition voltage with respect to one frame period and the magnitude of the anti-back-transition voltage are constant. Note that the characteristics represented by the long and short dashed line in FIG. 10 are varied depending on the liquid crystal material used for the liquid crystal panel 110, and therefore only general tendencies are illustrated herein. As evident from FIG. 10, as the temperature in the vicinity of the liquid crystal panel 110 is increased, it is required to increase an applied voltage Vw corresponding to white display. Note that, in the liquid crystal panel 110 operating in normally white mode, as the level of the video signal is higher, the voltage to be applied to each pixel of the liquid crystal panel 110 is smaller. Therefore, increasing the applied voltage Vw corresponding to white display means decreasing the gain of the video signal (a gain with reference to a signal level corresponding to black display). Thus, in accordance with the output from the temperature sensor 108, the calculating section 306 outputs the gain of the video signal based on the relation represented by a solid line in FIG. 10. More specifically, when the temperature detected by the temperature sensor 108 is 20° C., for example, a gain with which the applied voltage Vw corresponding to white display is a voltage C is output to the controller 304. Similarly, when the temperature detected by the temperature sensor 108 is 20° C. and 40° C., a gain with which the applied voltage Vw corresponding to white display is a voltage D and a voltage E, respectively, is output to the controller 304.

The controller 304 alternately outputs, to the source driver 304, an image signal for one line read from the line memory 102 and a non-image signal for one line for applying the anti-back-transition voltage to the OCB cells. At this time, the controller 304 adjusts the signal amplitude of the image signal based on the gain output from the calculating section 306.

In the above-described manner, each pixel on the liquid crystal panel 110 is applied with a video signal whose applied voltage Vw corresponding to white display has the appropriate magnitude in accordance with the detection result of the temperature sensor 108. Therefore, back transition can be prevented even when the liquid crystal temperature is increased. Furthermore, when the liquid crystal temperature is low, the magnitude of the applied voltage Vw corresponding to white display is suppressed. Therefore, a decrease in maximum luminance caused by an increase made more than necessary in the applied voltage Vw corresponding to white display can be suppressed.

Note that, in the present embodiment, the output from the calculating section 306 is determined based on a smooth transfer function as illustrated in FIG. 10. Alternatively, determination can be made based on the translation table as illustrated in FIG. 2.

(Fourth Embodiment)

Depending on the usage environment of the liquid crystal panel, the temperature of the liquid crystal panel may vary on portions due to influences, such as irradiation of sunlight. Therefore, in the fourth embodiment, for the purpose of improving the accuracy in detection of the liquid crystal's temperature, a plurality of temperature sensors are placed. With reference to drawings, a liquid crystal apparatus according to a fourth embodiment of the present invention is described below.

Figure 11:
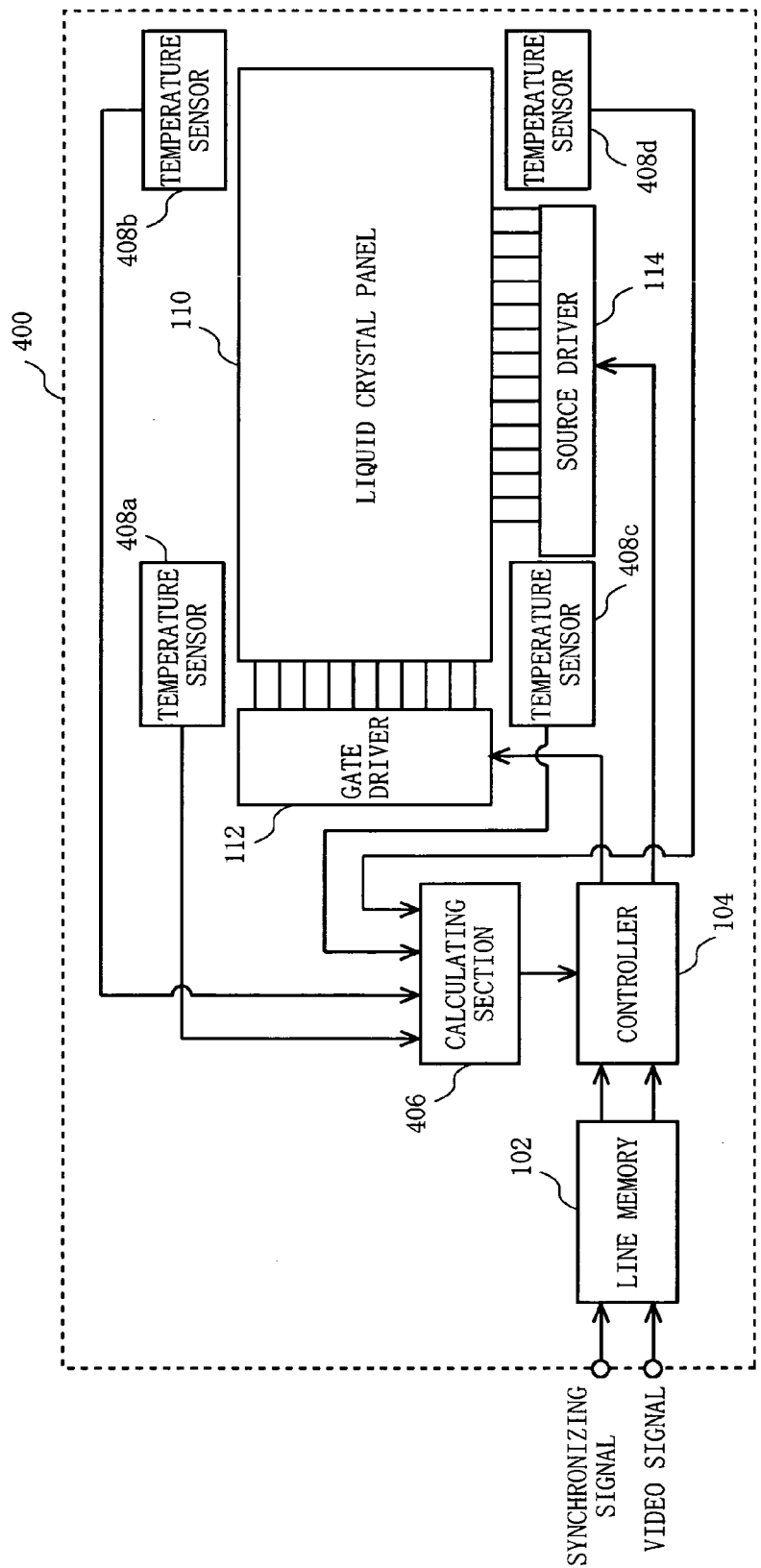
FIG. 11 is a block diagram illustrating the configuration of a liquid crystal display apparatus according to a fourth embodiment of the present invention.

FIG. 11 illustrates the configuration of the liquid crystal display apparatus according to the fourth embodiment of the present invention. In FIG. 11, a liquid crystal display apparatus 400 includes the line memory 102, the controller 104, the liquid crystal panel 110, the gate driver 112, the source driver 114, temperature sensors 408a through 408d, and a calculating section 406. Note that, in FIG. 11, the components equivalent to those in FIG. 1 are provided with the same reference numerals, and are not described herein.

The four temperature sensors 408a through 408d are spaced apart from each other in the vicinity of the liquid crystal panel 110. The calculating section 406 extracts a maximum value of temperatures detected by the temperature sensors 408a through 408d and, based on the maximum value, refers to the translation table illustrated in FIG. 2 to calculate the ratio of the time period of applying the anti-back-transition voltage with respect to one frame period. Other processes are similar to those in the first embodiment.

As described above, according to the present embodiment, even when the temperature of the liquid crystal panel 110 is unbalanced, the ratio of the time period of applying the anti-back-transition voltage with respect to one frame period can be determined based on the temperature at the location having the highest temperature. Therefore, it is possible to effectively prevent back transition from occurring locally due to an imbalance in temperature of the liquid crystal panel 110.

Note that, in the present embodiment, the number of temperature sensors is four. However, the number of temperature sensors is not restricted to this. It is preferable to provide an appropriate number of temperature sensors in consideration of the size of the liquid crystal panel or its usage environment.

Furthermore, in the present embodiment, the ratio of the time period of applying the anti-back-transition voltage with respect to one frame period is controlled based on the maximum value of the detected values of the four temperature sensors 408a through 408d. Alternatively, the present embodiment can be applied to the second and third embodiments to control the magnitude of the anti-back-transition voltage or the gain of the video signal based on the maximum value of the detected values of the four temperature sensors 408a through 408d.

(Fifth Embodiment)

In the above first through fourth embodiments, the temperature of the liquid crystal is detected as a fluctuating factor for a back-transition occurrence condition. Based on this, the preventive effects against back transition are controlled. However, the temperature of the liquid crystal is not the only fluctuating factor, and there are other fluctuating factors for the back-transition occurrence condition. It is known from the research results of the inventors that back transition tends not to occur as the state of the OCB liquid crystal becomes more unstable. That is, back transition tends not to occur as a frequency of writing of signals of different levels per unit time is higher. Such a frequency of writing of signals of different levels per unit time is varied in accordance with a frame frequency of an input signal, for example. As a fifth embodiment, a liquid crystal display apparatus is described below which detects the frame frequency of the video signal as the fluctuating factor for back transition occurrence condition and, based on this, controls the preventive effects against back transition.

Figure 12:
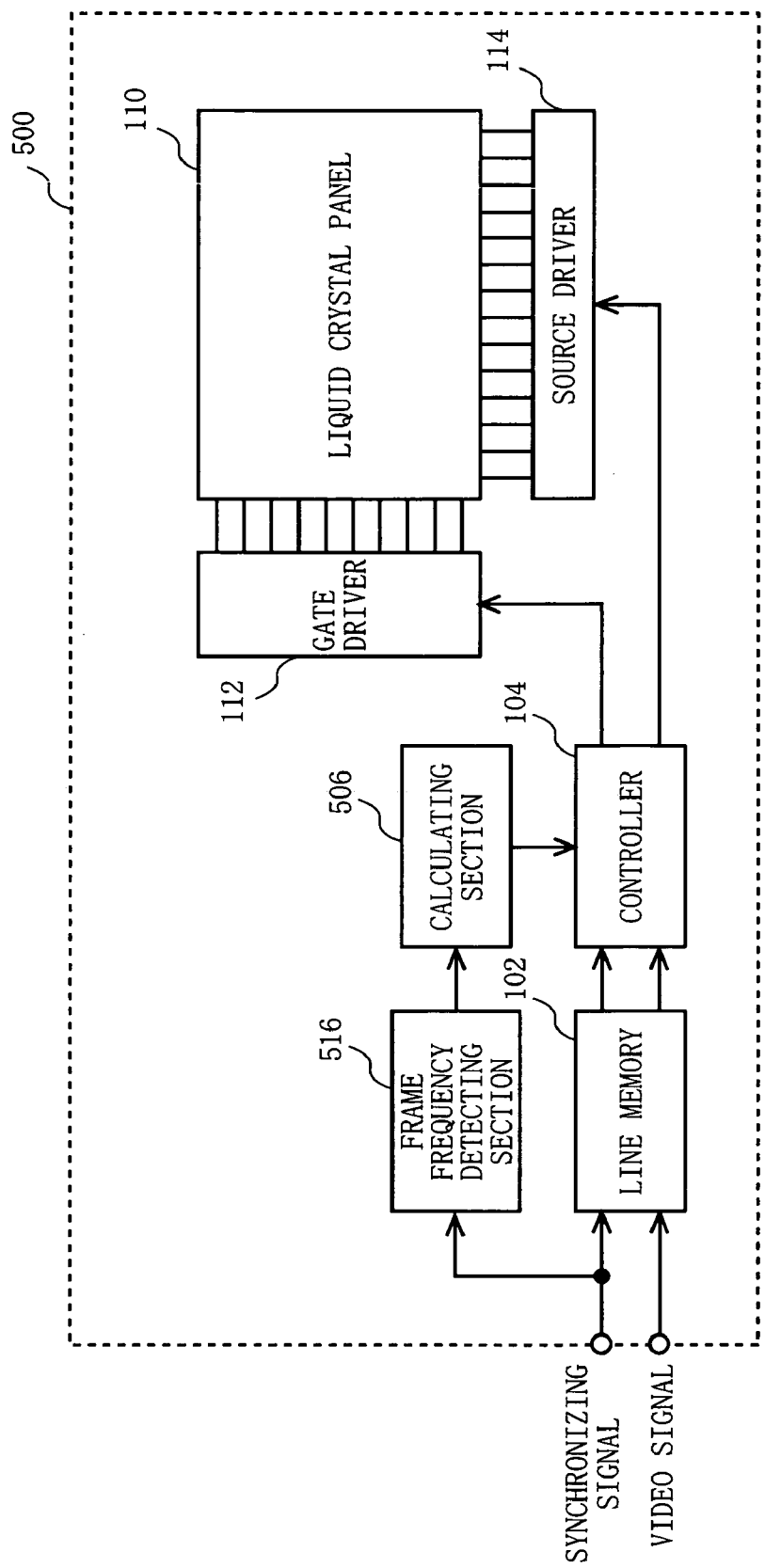
FIG. 12 is a block diagram illustrating the configuration of a liquid crystal display apparatus according to a fifth embodiment of the present invention.

FIG. 12 illustrates the configuration of the liquid crystal display apparatus according to the fifth embodiment of the present invention. In FIG. 12, a liquid crystal display apparatus 500 includes the line memory 102, the controller 104, the liquid crystal panel 110, the gate driver 112, the source driver 114, a calculating section 506, and a frame frequency detecting section 516. Note that, in FIG. 12, the components equivalent to those in FIG. 1 are provided with the same reference numerals, and are not described herein.

The frame frequency detecting section 516 detects the frame frequency of the video signal based on the synchronizing signal. Based on the frame frequency detected by the frame frequency detecting section 516, the calculating section 506 calculates the ratio of the time period of applying an optimal anti-back-transition voltage with respect to one frame period.

Figure 13:
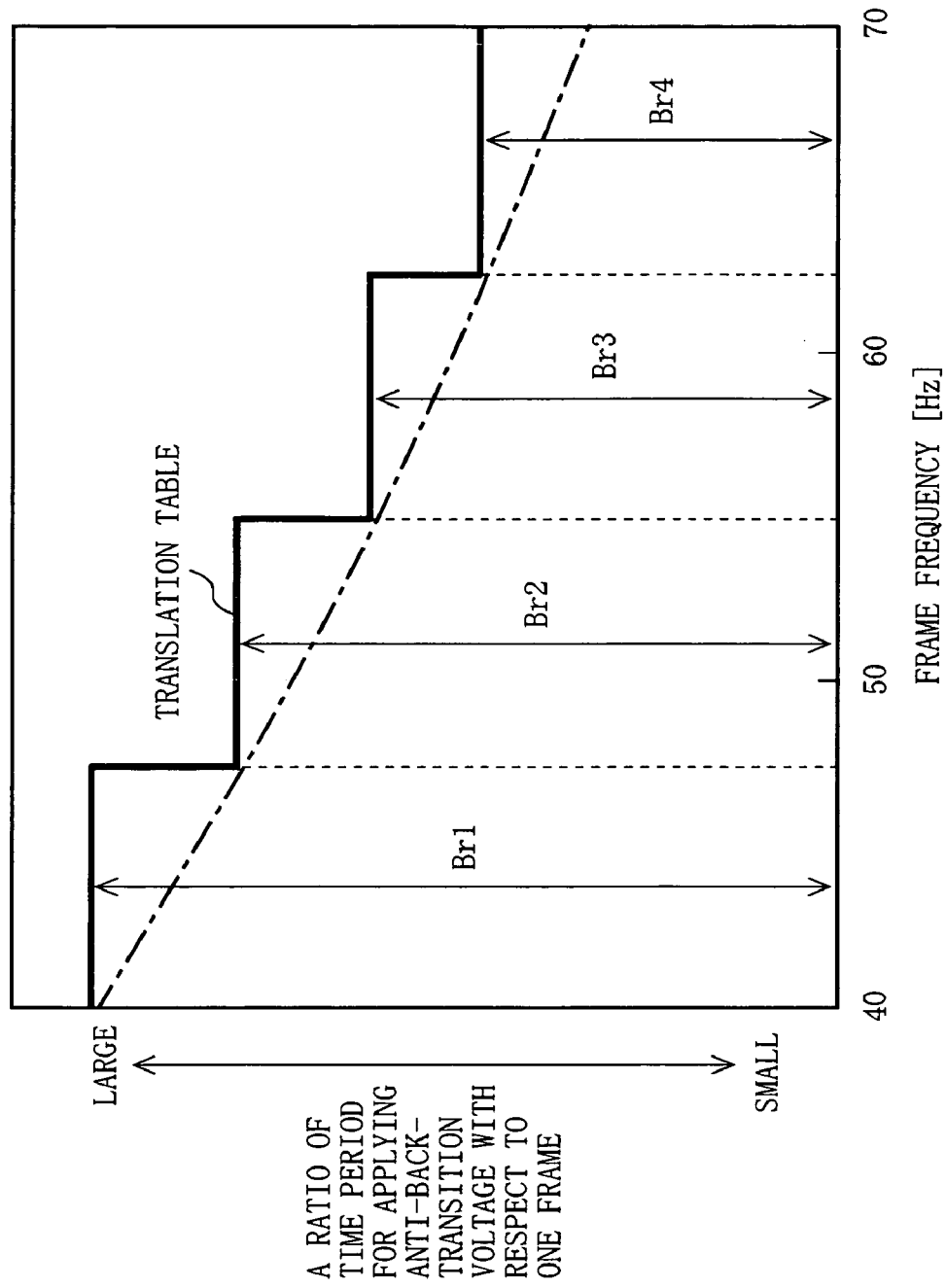
FIG. 13 is an illustration showing a relation between inputs and outputs of a calculating section.

FIG. 13 illustrates input-output characteristics of the calculating section 506. In FIG. 13, a long and short dashed line represents a relation between detection results of the frame frequency detecting section 516 and the minimum values of the ratio of the time period of applying the anti-back-transition voltage, with which back transition is preventable, with respect to one frame period. Note that, as described above, as the liquid crystal temperature is fluctuated, the minimum value of the ratio of the time period of applying the anti-back-transition voltage, with which back transition is preventable, with respect to one frame period is varied. Therefore, the input-output characteristics illustrated herein are in a case where the liquid crystal temperature is constant. Note that the characteristics represented by the long and short dashed line in FIG. 13 are varied depending on the liquid crystal material used for the liquid crystal panel 110, and therefore only general tendencies are illustrated herein. Now, when the frame frequency is changed, it might be easily thought to change the time period of applying an anti-back-transition voltage per one frame accordingly (that is, so that the ratio of the applying time period with respect to one frame period). It has been confirmed, however, that merely doing that is not sufficient. That is, as evident from FIG. 13, as the frame frequency of the video signal is decreased, it is required to increase the ratio of the time period of applying the anti-back-transition voltage with respect to one frame period. Therefore, the calculating section 506 uses a translation table represented by a solid line in FIG. 13 and created in advance based on the relation represented by this long and short dashed line to determine ratios of the time period of applying the anti-back-transition voltage with respect to one frame period (Br1 through Br4) in accordance with the detection results of the frame frequency detecting section 516. Furthermore, based on the current frame frequency, the ratios are converted to applying time period per one frame (B1 through B4) for output. Thereafter, as with the first embodiment, the controller 104 causes, based on the outputs (B1 through B4) from the calculating section 506, the gate driver 112 to select a gate line in appropriate timing.

In the above-described manner, each pixel on the liquid crystal panel 110 is applied with the anti-back-transition voltage for an appropriate period of time in accordance with the detection results of the frame frequency detecting section 516. Therefore, back transition can be prevented even when the frame frequency of the video signal is low. Furthermore, when the frame frequency of the video signal is high, the ratio of the time period of applying the anti-back-transition voltage for one frame period is decreased. Therefore, a decrease in maximum luminance caused by an increase made more than necessary in the ratio of the applying time period with respect to one frame period can be suppressed.

Note that, in the present embodiment, the calculating section 506 uses the translation table of four steps. As with the first embodiment, this is not restrictive in the present invention.

Also, in the present embodiment, the ratio of the time period of applying the anti-back-transition voltage with respect to one frame period is controlled based on the detection results of the frame frequency detecting section 516. Alternatively, the present embodiment can be applied to the second and third embodiments to control the magnitude of the anti-back-transition voltage or the gain of the video signal based on the detection results of the frame frequency detecting section 516.

Furthermore, the above first through fifth embodiments can be combined as appropriate. For example, in consideration of both of the detection value(s) of the temperature sensor(s) and the detection values of the frame frequency detecting section, it is possible to control the ratio of the time period of applying the anti-back-transition voltage with respect to one frame period, the magnitude of the anti-back-transition voltage, and the applied voltage corresponding to white display (gain of the video signal). The relation of inputs and outputs of the calculating section in this case is represented by a function F (Tmp, Fr), where the temperature is Tmp and the frame frequency (frame rate) is Fr. One scheme can be thought, for example, in which an output from the calculating section is approximately determined as F(Tmp)×F(Fr). At this time, if F(Fr) is approximated with a linear function in consideration of the fact that the long and short dashed line illustrated in FIG. 13 approximates to a solid line, the processing of the calculating section can be simplified.

Still further, it is possible to simultaneously control two or more of the following: the ratio of the time period of applying the anti-back-transition voltage with respect to one frame period, the magnitude of the anti-back-transition, and the applied voltage corresponding to white display (gain of the video signal).

INDUSTRIAL APPLICABILITY

As described in the foregoing, according to the present invention, it is possible to provide a liquid crystal display apparatus using a liquid crystal panel in OCB mode, the apparatus capable of optimally displaying video irrespectively of fluctuations in a back transition occurrence condition.

The invention claimed is:

1. A liquid crystal display apparatus which displays video by driving a liquid crystal panel in OCB mode based on a video signal, the liquid crystal display apparatus comprising:
   a detecting section for detecting a value of a parameter that causes fluctuations in a back transition occurrence condition;
   a calculating section for determining, in accordance with the detection value of the detecting section, a ratio of a time period of applying a high voltage with respect to one frame period, the high voltage being applied to the liquid crystal panel in order to prevent back transition; and
   a controller for alternately outputting a video signal and a non-image signal for applying the high voltage, and driving the liquid crystal panel on a condition in accordance with the determination result of the calculating section,
   wherein the detecting section is a temperature sensor placed in the vicinity of the liquid crystal panel, and
   wherein the calculating section
      a) determines the ratio of the time period of applying the high voltage with respect to one frame period as being relatively high when the temperature detected by the temperature sensor is higher than a predetermined temperature, and
      b) determines the ratio of the time period of applying the high voltage with respect to one frame period as being relatively low when the temperature detected by the temperature sensor is lower than the predetermined temperature.

2. The liquid crystal display apparatus according to claim 1, wherein:
   the calculating section is further for determining a magnitude of the high voltage, the calculating section being operable to determine
      a) the magnitude of the high voltage as being relatively high when the temperature detected by the temperature sensor is higher than the predetermined temperature, and
      b) the magnitude of the high voltage as being relatively low when the temperature detected by the temperature sensor is lower than the predetermined temperature.

3. The liquid crystal display apparatus according to claim 1, wherein:

the calculating section is further for determining an applied voltage corresponding to white display, the calculating section being operable to determine a) the applied voltage corresponding to white display as being relatively high when the temperature detected by the temperature sensor is higher than the predetermined temperature, and b) the applied voltage corresponding to white display as being relatively low when the temperature detected by the temperature sensor is lower than the predetermined temperature.

4. A driving method performed by a liquid crystal display apparatus which displays video by driving a liquid crystal panel in OCB mode, the driving method comprising:

detecting a value of a parameter that causes fluctuations in a back transition occurrence condition;

determining, in accordance with the detected value, a ratio of a time period of applying a high voltage with respect to one frame period, the high voltage being applied to the liquid crystal panel in order to prevent back transition;

alternately outputting a video signal and a non-image signal for applying the high voltage; and driving the liquid crystal panel on a condition in accordance with the determination result, wherein a temperature in the vicinity of the liquid crystal panel is detected as the value of the parameter, and wherein a) the ratio of the time period of applying the high voltage with respect to one frame period is determined as being relatively high when the detected temperature is higher than a predetermined temperature, and b) the ratio of the time period of applying the high voltage with respect to one frame period is determined as being relatively low when the detected temperature is lower than the predetermined temperature.

5. The driving method performed by the liquid crystal apparatus according to claim 4, wherein the determining further comprises a) determining a magnitude of the high voltage as being relatively high when the detected temperature is higher than the predetermined temperature, and b) determining the magnitude of the high voltage as being relatively low when the detected temperature is lower than the predetermined temperature.

6. The driving method performed by the liquid crystal apparatus according to claim 4, wherein the determining further comprises a) determining an applied voltage corresponding to white display as being relatively high when the detected temperature is higher than the predetermined temperature, and b) determining the applied voltage corresponding to white display as being relatively low when the detected temperature is lower than the predetermined temperature.

* * * * *